Dec. 1, 1959     H. H. DOSWELL     2,915,206
VAULT HANDLING VEHICLE
Filed Nov. 23, 1956                                                           4 Sheets-Sheet 1

INVENTOR.
HAROLD H. DOSWELL
BY
*M. A. Hobbs*
ATTORNEY

Dec. 1, 1959    H. H. DOSWELL    2,915,206
VAULT HANDLING VEHICLE

Filed Nov. 23, 1956    4 Sheets-Sheet 2

INVENTOR.
HAROLD H. DOSWELL
BY
M. A. Hobbs
ATTORNEY

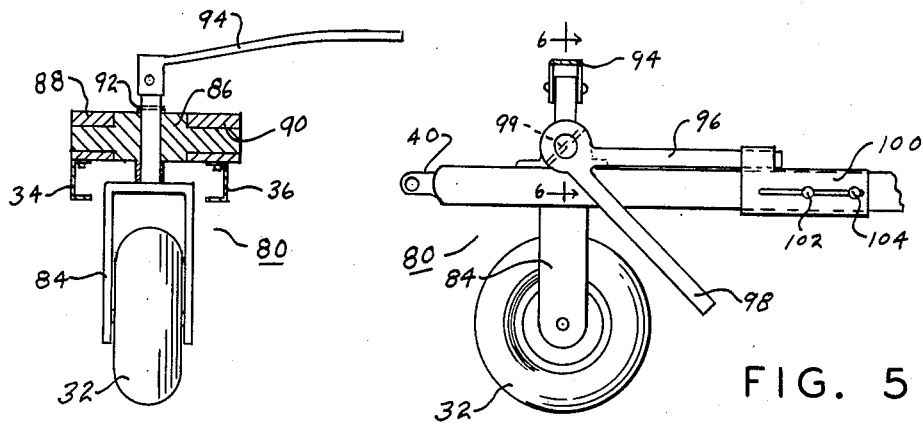
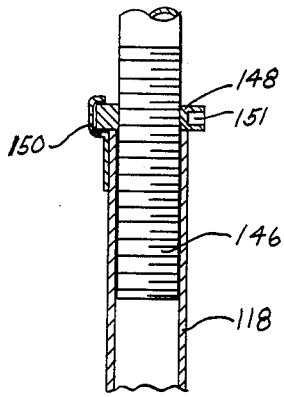
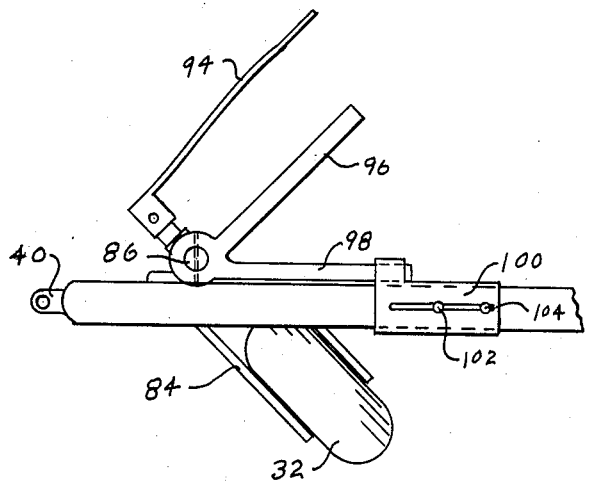

Dec. 1, 1959  H. H. DOSWELL  2,915,206
VAULT HANDLING VEHICLE
Filed Nov. 23, 1956  4 Sheets-Sheet 4

INVENTOR.
HAROLD H. DOSWELL
BY
M. A. Hobbs
ATTORNEY

United States Patent Office 2,915,206
Patented Dec. 1, 1959

2,915,206

VAULT HANDLING VEHICLE

Harold H. Doswell, Fort Wayne, Ind.

Application November 23, 1956, Serial No. 624,137

3 Claims. (Cl. 214—75)

The present invention relates to a burial vault handling vehicle and more particularly to a vehicle for transporting burial vaults to the graves and thereafter lowering the vaults directly from the vehicle into place in the graves.

Difficulties are frequently experienced in transporting a burial vault in the cemetery to the grave and there lowering it into place over a casket, particularly where the terrain is uneven and, in the winter and spring months of the year, when the ground is soft and slippery. Heavy vehicles such as trucks are unsatisfactory in that they cut into the top soil, destroying or severely damaging the cemetery lawns and often cannot move to the edge of the grave because the ground around the grave is not sufficiently firm to support such vehicles. Various types of other vehicles have been tried but these are either too heavy or too difficult to handle to be practical under the aforementioned adverse conditions. It is therefore one of the principal objects of the present invention to provide a relatively light weight, power driven vehicle which is adapted to transport a vault directly to the grave side and there unload it directly into the grave, without causing any serious damage to the cemetery lawn or to the ground support around the grave.

Another object of the present invention is to provide a burial vault handling apparatus which will adapt itself to uneven terrain at the grave side so that the vault can be lowered directly from the apparatus and placed over the casket in the grave.

Still another object is to provide a power driven vehicle which has maximum maneuverability both in transporting the vault to the grave and in being positioned for lowering the vault into the grave.

Another object of the invention is to provide a vault handling trailer which can easily be loaded, pulled to the cemetery, moved to the grave side and unloaded, with a minimum of manual operations.

A further object of the invention is to provide a power driven vault handling apparatus of the aforesaid type which is provided with a pump for removing water from the grave before the vault is lowered therein.

Additional objects and advantages of the invention will become apparent from the following description and accompanying drawings, wherein:

Figure 5 is a side elevational view of the front wheel assembly of my apparatus;

Figure 6 is a front elevational and partial cross sectional view of the front wheel assembly, the section being taken on line 6—6 of Figure 5;

Figure 7 is a side elevational view of the front wheel assembly showing the wheel in its inoperative position;

Figure 8 is a vertical cross sectional view of a height adjustment means for the hoist frame of my apparatus;

Figure 1:
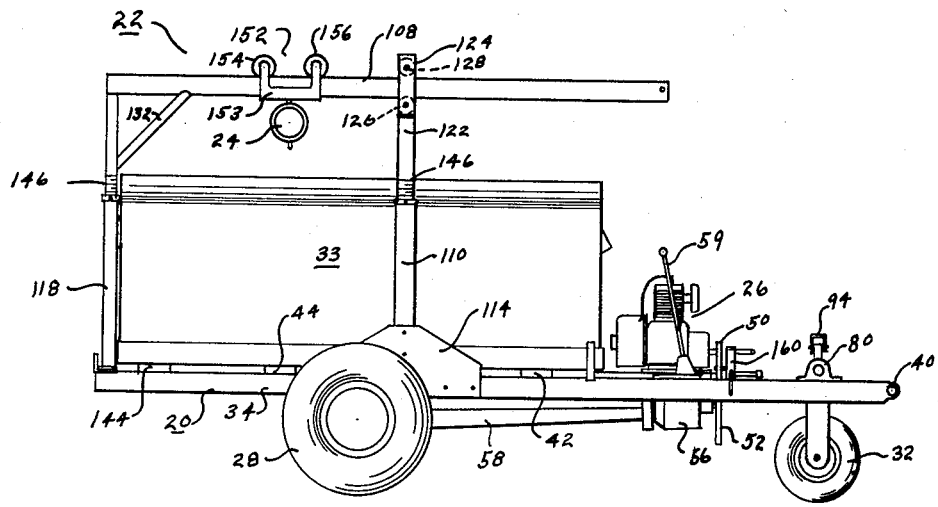
Figure 1 is a side elevational view of my burial vault handling vehicle showing a vault loaded thereon.
Figure 2:
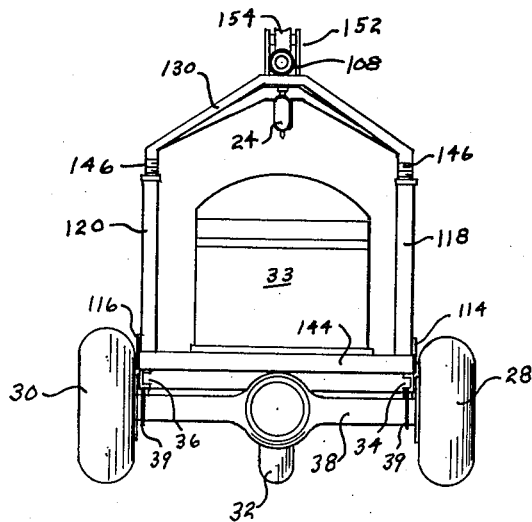
Figure 2 is an end elevational view of my vault handling vehicle with a vault thereon.

Referring more specifically to the drawings and to Figure 1 in particular, numeral 20 designates the bed of my vault handling vehicle, 22 a hoist frame, 24 a hoist, 26 a motor for propelling the vehicle and wheels 28, 30 and 32 on which the bed is mounted. A burial vault 33 is shown loaded on the vehicle in position for being transported to the cemetery. In the present embodiment bed 20 consists of two horizontal members 34 and 36 mounted on the rear axle housing 38 for wheels 28 and 30 and rigidly secured to the housing by U-bolts 39. These members are parallel to each other from the motor to the rear end of the bed and are tapered inwardly toward the front, coming together at coupling 40. One or more cross members 42 resting on members 34 and 36 in front of housing 38 and secured to said members by bolts or the like support the front end of the vault, and one or more cross members 44 removably resting on members 34 and 36 behind the housing support the rear end of the vault. The tires on the wheels are preferably oversize, low pressure pneumatic tires since this type of tire causes a minimum amount of damage to the cemetery lawn.

The vault shown on the vehicle is an inverted type, i.e. the opening is in the bottom and the top is completely closed. The casket is sealed in this type of vault by lowering the vault into the grave over the casket onto the vault bottom on which the casket rests. The present vehicle is adapted to handle any other standard type burial vault, septic tanks, drain tile, stone and concrete building materials, and the like. However, for convenience of description, only the operation of the vehicle with the inperted type vault will be described hereafter, and the term "vault" as used herein and in the claims is intended to include the various aforementioned devices and products.

Figures 9, 10:
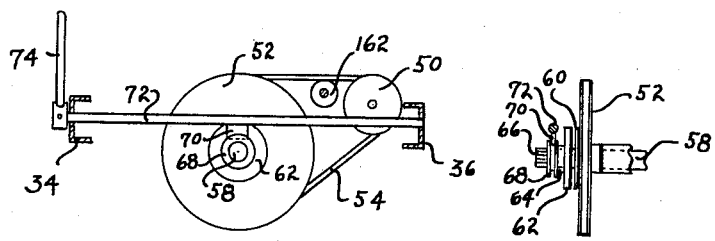
Figures 9 and 10 are elevational views of the drive mechanism for my apparatus.
Figures 11, 12:
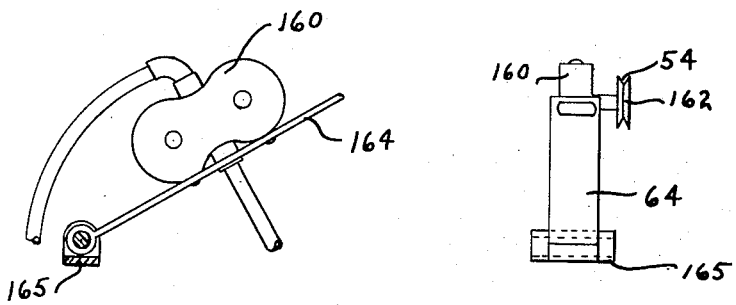
Figures 11 and 12 are elevational views of a pump forming a part of my vault handling apparatus.
Figure 13:
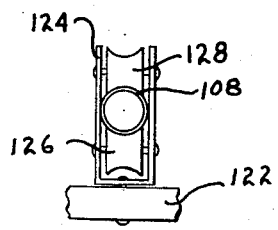
Figure 13 is a fragmentary elevational view of a detail of the hoist structure.

The motor 26 shown in the drawings is a conventional two cycle gasoline engine within the range of two to ten horse power. This motor is mounted on cross members of the frame and drives the vehicle through pulleys 50 and 52, V-belt 54, transmission 56, drive shaft 58 and the rear axle disposed in housing 38 along with a differential. The transmission, drive shaft, differential and rear axle may, for the purpose of the present description, be considered as conventional mechanisms of the type used in manual gear shift automobiles of the popular low price class, such as Ford, Chevrolet and Plymouth cars. The transmission includes reverse and forward, the shifting being controlled by gear shift lever 59. Only one speed in either direction is required for all normal use of the vehicle. Figures 9 and 10 show a suitable drive from the motor to drive shaft 58 including a clutch consisting of a clutch plate 60 secured to and concentric with pulley 52 which together with said plate is journalled on and adapted to rotate freely on shaft 58. A second clutch plate 62 is mounted on and rotates in unison with shaft 58, said second plate however being movable axially on said shaft to and from said first clutch plate. Plate 62 is preferably joined to said shaft 58 by a sleeve 64 and a spline 66 and is moved to engagement with and away from clutch plate 60 by grooved collar 68, lever 70 and rod 72. Rod 72 is rotated by handle 74 which moves lever 70, collar 68 and clutch plate 62 toward or away from plate 60. Any other suitable type of clutch mechanism may be substituted for the one described in detail herein; for example a movable mount for the motor can be used to slacken belt 54 sufficiently to permit it to slip on pulley 50 when the use of the motor is temporarily discontinued.

The front wheel assembly 80 consists of a single wheel 32 mounted on a fork 84 which is pivoted in a transversely arranged shaft 86 journalled in bearings 88 and 90 secured on members 34 and 36 respectively. The fork which is retained in place in shaft 86 by a collar 92 is turned by a handle 94 to guide the vehicle. Since the front wheel assembly 80 is not used while the vehicle is being pulled as a trailer, it is lifted to an inoperative position as shown in Figure 7. As seen in this figure and Figure 5, two rods 96 and 98 are rigidly secured to shaft 86 by a pin 99 and these rods are adapted to be held by a latch 100 mounted on member 36 of the bed. When rod 96 is held by latch 100, as shown in Figure 5, the wheel assembly is held in its operative position, whereas when rod 98 is held by the latch, as shown in Figure 7, the wheel assembly is held in its inoperative position. Latch 100 which is retained on member 36 by bolts 102 and 104 is moved to and from its latched position by sliding it to the left or right as viewed in Figures 5 and 7.

Figure 3:
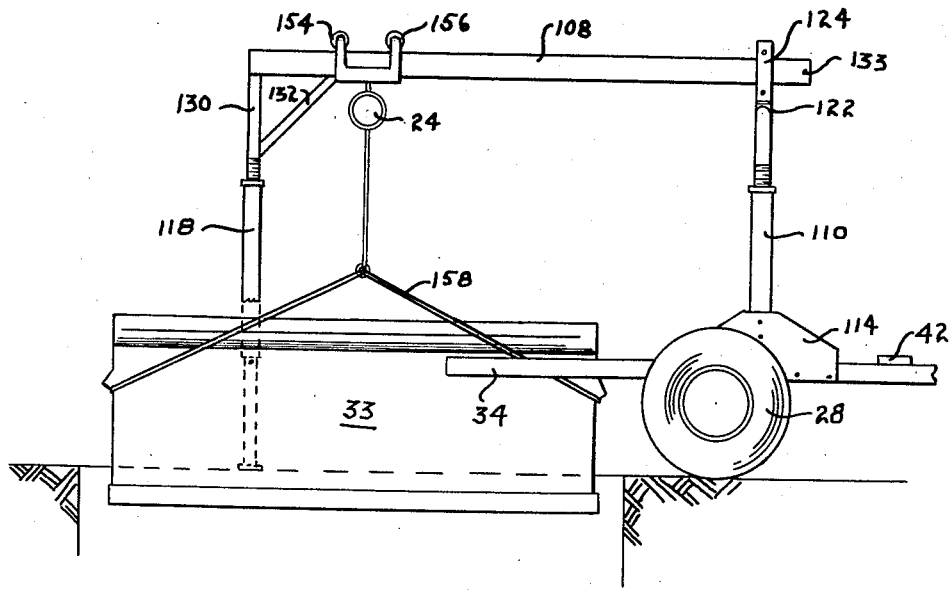
Figure 3 is a partial elevational view of my vault handling vehicle showing it in the vault unloading position.
Figure 4:
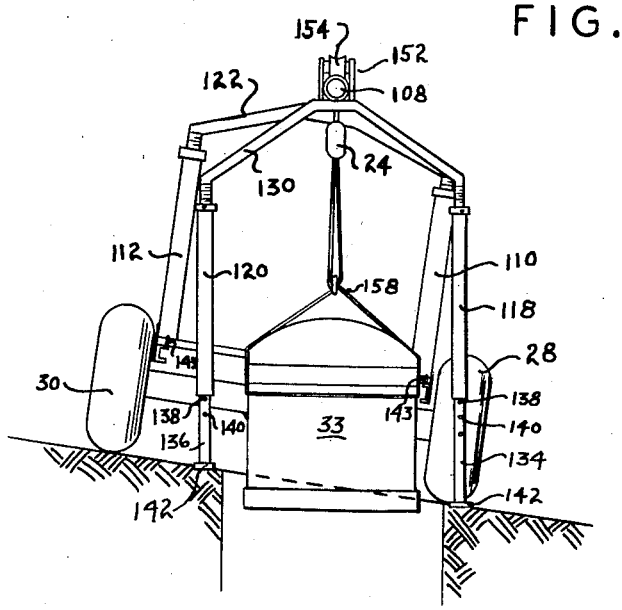
Figure 4 is an end elevational view of my vehicle illustrating its adaptability to uneven terrain.

The hoist frame 22 includes a beam 108 supported at one end by posts 110 and 112 secured to the bed and held in a vertical position thereon by side plates 114 and 116 bolted or otherwise joined to the posts and to the respective members 34 and 36, and at the other end by posts 118 and 120 adapted to be removed from the vehicle bed and placed upon the ground as shown in Figures 3 and 4. The front end of beam 108, which in this modification is a round pipe, is supported by and held on cross member 122 between posts 110 and 112 by a fixture 124 pivoted at the bottom to cross member 122 and including a bottom roller 126 which supports the beam and a top roller 128 which guides the beam and keeps it seated firmly against the lower roller while adjustments are being made in the hoist frame. The rear end of the beam is supported by and connected to cross member 130 and held rigidly in place by a pair of braces 132 between beam 108 and respective posts 118 and 120. The beam moves longitudinally between rollers 126 and 128 from the position shown in Figure 1 to the position shown in Figure 3. A stop pin 133 may be provided in the end of beam 108 to prevent it from being pulled completely off roller 126 when the frame is being extended.

Since posts 118 and 120 must be extended when they are moved from the rear of the vehicle bed to the vault unloading position shown in Figure 4, pipes 134 and 136 are slidably mounted in the lower end of the posts and adapted to be extended to various positions and held in the extended position by a pin 138 inserted in one of a series of vertically arranged holes 140 in said pipes. The pipes which will telescope completely into the posts are provided with shoes 142 in order to provide better footing on the ground or plank placed on the ground beside the grave. The posts may be held on the vehicle while in transit by any suitable means such as studs 143 rigidly secured to the rear ends of members 34 and 36 and extending into a hole in the bottom of the respective shoe. A movable cross member 144 may be provided at the rear of the bed if desired; however this member together with cross members 44 must be removed when the vault is to be lowered into the grave.

Since vaults vary in size the hoist frame is made adjustable to accommodate the variations. Each cross member 122 and 130 is provided with legs 146 which extend into the top ends of posts 110, 112, 118 and 120 and are threaded a substantial distance up from the bottom thereof as shown in Figure 8. Taps or nuts 148 are threaded onto the legs and when the legs are inserted in the top end of the posts the nuts come to rest on the top end of the posts. The height of cross members 122 and 130 and consequently of beam 108 is adjusted by screwing the nuts on each of the posts to the desired position, raising or lowering the beam. In order to prevent posts 118 and 120 from slipping off legs 146 while they are being moved from and back to the vehicle during the vault lowering operation, a retaining bracket 150 extending around and above the nut is secured to the upper end of each of the posts. To facilitate making an adjustment a plurality of radial holes 151 may be provided in the periphery of the nuts for receiving a bar to be used as a lever.

Hoist 24 is supported by a trolley 152 consisting of an underslung frame 153 mounted on beam 108 by two rollers 154 and 156 which permit the trolley to move freely along the beam while carrying the vault from the vehicle bed to a position over the grave. The hoist which is of a conventional and well known construction of the manually operated type supports the vault with a cable, rope or chain 158 in the manner shown in Figures 3 and 4.

Since graves often become partially filled with water soon after being dug, the vehicle is provided with a power driven water pump 160 which in this instance is shown as a conventional gear type driven from the V-belt 54 through pulley 162. The pump is mounted on a support 164 which is pivoted on the bed of the vehicle by bracket 165 and when the pump is to be operated the intake hose is placed in the grave and the support pivoted to the point where pulley 162 engages belt 54. Any other suitable drive for the pump may be substituted for the one just described.

In the operation of the present vehicle or apparatus the burial vault of the inverted type is loaded onto the bed of the vehicle normally using the hoist with the frame in the extended position shown in Figure 3. After the hoist has raised the vault and moved it forward over the bed, cross members 44 are placed on members 34 and 36 and the vault is then lowered to the position shown in Figure 1, resting on cross members 42 and 44. Cable 158 used in lifting the vault is preferably kept sufficiently taut to prevent the hoist from swinging and to hold posts 118 and 120 firmly in place on the bed while the vehicle is being pulled as a trailer to the cemetery. When the vehicle is ready to be moved it is connected to a truck or tractor using coupling 40 and front wheel assembly 80 is moved from its operative position shown in Figure 5 to its raised position shown in Figure 7. After arriving at the cemetery the front wheel assembly is returned to its operative position and the vehicle is uncoupled from the truck and driven by motor 26 to the grave side. The vehicle is normally backed to the grave, i.e. driven with wheels 28 and 30 in front. While the vehicle is being moved in this manner by the motor, the operator steers it by turning the wheel assembly 80 with lever 94 and controls the speed by gear shift lever 59 and clutch lever 74. When the vehicle has been maneuvered into position at one end of the grave with wheels 28 and 30 spaced only a short distance from the edge, the cable is relaxed by the hoist sufficiently to permit the hoist frame to be moved into the position shown in Figures 3 and 4 with extensions 134 and 136 adjusted to rest on either side of the grave and preferably each extended the distance necessary to place cross member 130 in a horizontal position. The vault is then lifted by the hoist and moved by the trolley 152 on beam 108 to a position directly over the grave and after cross members 44 have been removed from the bed, is lowered into place over the casket.

After the cable is removed from the vault, the hoist frame is returned to its position on the vehicle shown in Figure 1 and the cable is attached to the vehicle bed and pulled taut by the hoist sufficiently to prevent the hoist from swinging and to hold the hoist frame in place on the bed. The vehicle is then driven by the motor from the grave.

It is noted from Figure 4 that one of the principal advantages of the present vehicle is the adaptability of the hoist to uneven ground around the grave. The beam 108 will rotate in fixture 124 to permit posts 118 and 120 to assume their normal vertical position on either side of the grave. Further, by having fixture 124 pivoted to cross member 122 the hoist frame can be easily placed in position without requiring the operator to place the vehicle accurately at a specific point adjacent the grave.

Various changes and modifications can be made in my vault handling vehicle without departing from the scope of the present invention.

I claim:

1. A burial vault handling vehicle, comprising a bed having two longitudinal parallel frame members spaced apart sufficiently to permit a vault to pass therebetween, an axle transversely positioned beneath and supporting said frame members, wheels on each end of said axle, parallel upright members mounted rigidly on said frame members along the side of said bed, a cross member supported by said upright members and extending over the bed, a longitudinally slidable and rotatable beam supported by said cross member and extending to the rear end of said bed, a means for pivotally and slidably supporting said beam on said cross member, a cross member of a length substantially equal to the width of said bed rigidly secured to the rear end of said beam, a vertical leg connected rigidly to each end of said last mentioned cross member spaced substantially the same distance apart as said frame members to permit a vault to pass therebetween, extension members on said legs for varying the length thereof so that in one position of said beam they are supported by the rear end of said bed and in another position on the ground on either side of a grave, a trolley on said beam between said cross members, a hoist carried by said trolley, a wheel on the front end of said frame members, a means for steering said wheel, and a motor mounted on said frame members and connected to said axle for driving said first mentioned wheels, said beam being long enough to permit said legs to be moved a substantial distance rearwardly of the vehicle and supported on uneven ground without disconnecting the forward end of the beam from the front frame, thereby permitting the vault to be moved from the vehicle over the grave for lowering purposes.

2. A burial vault handling vehicle, comprising a bed having two longitudinal parallel frame members spaced apart sufficiently to permit a vault to pass therebetween, an axle transversely positioned beneath and supporting said frame members, wheels on each end of said axle, parallel upright members mounted rigidly on said frame members along the side of said bed, a cross member supported by said upright members and extending over the bed, a longitudinally slidable beam supported by said cross member and extending to the rear end of said bed, a means for pivotally and slidably supporting said beam on said cross member, a cross member of a length substantially equal to the width of said bed rigidly secured to the rear end of said beam, a vertical leg connected rigidly to each end of said last mentioned cross member spaced substantially the same distance apart as said frame members to permit a vault to pass therebetween, extension members on said legs for varying the length thereof so that in one position of said beam they are supported by the rear end of said bed and in another position on the ground adjacent a grave, a hoist supported by said beam between said cross members, and a wheel on the front end of said frame members, said beam being long enough to permit said legs to be moved a substantial distance rearwardly of the vehicle and supported on uneven ground without disconnecting the forward end of the beam from the front frame, thereby permitting the vault to be moved from the vehicle over the grave for lowering purposes.

3. A burial vault handling vehicle, comprising a bed having two longitudinal parallel frame members spaced apart sufficiently to permit a vault to pass therebetween, an axle transversely positioned beneath and supporting said frame members, wheels on each end of said axle, means for driving said wheels, parallel upright members mounted rigidly on said frame members along the side of said bed, a cross member supported by said upright members and extending over the bed, a longitudinal beam supported by said cross member and extending to the rear end of said bed, a means for pivotally and slidably supporting said beam on said cross member adjacent the center thereof, a cross member of a length substantially equal to the width of said bed rigidly secured to the rear end of said beam, a vertical leg connected rigidly to each end of said last mentioned cross member spaced substantially the same distance apart as said frame members to permit a vault to pass therebetween, extension members on said legs for varying the length thereof so that in one position of said beam they are supported by the rear end of said bed and in another position on the ground, and a hoist carried by said beam movable between said cross members, said beam being long enough to permit said legs to be moved a substantial distance rearwardly of the vehicle and supported on uneven ground without disconnecting the forward end of the beam from the front frame, thereby permitting the vault to be moved from the vehicle over the grave for lowering purposes.

References Cited in the file of this patent

UNITED STATES PATENTS

| | | |
|---|---|---|
| 908,522 | Underwood | Jan. 5, 1909 |
| 1,745,045 | Romine | Jan. 28, 1930 |
| 2,504,232 | Smith | Apr. 18, 1950 |
| 2,516,364 | Caddell | July 25, 1950 |
| 2,562,189 | Harris | July 31, 1951 |
| 2,570,319 | Cassady | Oct. 9, 1951 |